United States Patent
Kobori (10) Patent No.: US 12,162,312 B2
(45) Date of Patent: Dec. 10, 2024

(54) TIRE FOR RUNNING ON ROUGH TERRAIN

(71) Applicant: Sumitomo Rubber Industries, Ltd., Kobe (JP)

(72) Inventor: Shuji Kobori, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/711,406

(22) Filed: Apr. 1, 2022

(65) Prior Publication Data

US 2022/0371378 A1 Nov. 24, 2022

(30) Foreign Application Priority Data

May 19, 2021 (JP) .................................. 2021-084804

(51) Int. Cl.
*B60C 11/11* (2006.01)
*B60C 11/03* (2006.01)

(52) U.S. Cl.
CPC ........... *B60C 11/11* (2013.01); *B60C 11/0302* (2013.01); *B60C 2200/10* (2013.01); *B60C 2200/14* (2013.01)

(58) Field of Classification Search
CPC ............. B60C 2011/10; B60C 2011/14; B60C 2011/06; B60C 11/11; B60C 11/0302; B60C 11/1315; B60C 11/1376; B60C 11/1392; B60C 11/1384; B60C 2200/10; B60C 2200/14

See application file for complete search history.

(56) References Cited

U.S. PATENT DOCUMENTS

| D585,015 S | 1/2009 | Sueishi |
| D877,052 S | 3/2020 | Yukiko |
| 2008/0283167 A1* | 11/2008 | Matsumura ......... B60C 11/1376 152/209.11 |
| 2010/0236678 A1* | 9/2010 | Sueishi ................. B60C 11/032 152/209.15 |
| 2012/0024440 A1* | 2/2012 | Ishida ..................... B60C 11/11 152/209.1 |

(Continued)

FOREIGN PATENT DOCUMENTS

| EP | 3 885 165 A1 | 9/2021 |
| EP | 3 909 788 A1 | 11/2021 |

(Continued)

OTHER PUBLICATIONS

Extended European Search Report for European Application No. 22170234.3, dated Sep. 19, 2022.

*Primary Examiner* — Cedrick S Williams
*Assistant Examiner* — Thomas Frank Schneider
(74) *Attorney, Agent, or Firm* — Birch, Stewart, Kolasch & Birch, LLP (57) ABSTRACT

A tire for running on rough terrain has a tread portion provided with crown blocks, middle blocks, and groove portions. Each of the crown blocks includes a ground contacting surface and a first wall surface located on a heel side in a tire rotational direction. The first wall surface is inclined to a toe side in the tire rotational direction as it goes inward in a tire radial direction from the ground contacting surface. Each of the groove portions has a length in the tire axial direction of 5% or more and 70% or less of a length in the tire axial direction of each of the middle blocks.

18 Claims, 4 Drawing Sheets

(56) References Cited

U.S. PATENT DOCUMENTS

| | | | |
|---|---|---|---|
| 2018/0147892 A1* | 5/2018 | Maeda | ................ B60C 11/0311 |
| 2018/0264888 A1 | 9/2018 | Hinami | |
| 2021/0300124 A1 | 9/2021 | Hikita | |
| 2023/0104245 A1* | 4/2023 | Hinami | ............... B60C 11/1323 |
| | | | 152/209.1 |
| 2023/0105894 A1* | 4/2023 | Hinami | ............... B60C 11/0311 |
| | | | 152/209.11 |

FOREIGN PATENT DOCUMENTS

| | | | |
|---|---|---|---|
| EP | 3 915 809 A1 | | 12/2021 |
| JP | 2-175305 A | | 7/1990 |
| JP | 3384716 B2 | | 3/2003 |
| JP | 2007112396 A | * | 5/2007 |
| JP | 2018-154241 A | | 10/2018 |
| JP | 2020-111262 A | | 7/2020 |

\* cited by examiner

TIRE FOR RUNNING ON ROUGH TERRAIN

RELATED APPLICATIONS

This application claims the benefit of foreign priority to Japanese Patent Applications No. JP2021-084804, filed May 19, 2021, which is incorporated by reference in its entirety.

FIELD OF THE INVENTION

The present disclosure relates to a tire for running on rough terrain.

BACKGROUND OF THE INVENTION

Japanese Patent Publication No. 3384716 has described a pneumatic tire with a plurality of blocks provided in a tread portion. The above-mentioned blocks are formed as inclined blocks each in which the block wall on the heel side (the side which comes in contact with the ground first, i.e., the fore side in the tire rotational direction) and the block wall on the toe side (the side which comes in contact with the ground last, i.e., the rear side in the tire rotational direction) are inclined so that the heel-side edge and the toe-side edge are inclined to the heel side with respect to the block wall bottoms. The inclined blocks configured as such are said to have a high surface scarification capacity and excellent running performance on rough terrain.

SUMMARY OF THE INVENTION

However, in recent years, there has been a demand to further improve traction performance and steering stability performance on rough terrain.

The present disclosure was made in view of the above, and a primary object thereof is to provide a tire for running on rough terrain having the improved traction performance and steering stability performance on rough terrain.

The present disclosure is a tire for running on rough terrain including a tread portion having a specified tire rotational direction and provided with crown blocks, middle blocks arranged outside the crown blocks in a tire axial direction, and groove portions arranged between the crown blocks and the middle blocks, wherein each of the crown blocks includes a ground contacting surface, a first wall surface located on a heel side in the tire rotational direction, and a first edge located at the intersection of the ground contacting surface and the first wall surface, the first wall surface is inclined to a toe side in the tire rotational direction as it goes inward in a tire radial direction from the ground contacting surface, and each of the groove portions has a length in the tire axial direction of 5% or more and 70% or less of a length in the tire axial direction of each of the middle blocks.

It is possible that the tire for running on rough terrain of the present disclosure improves the traction performance and the steering stability performance on rough terrain by adopting the above configuration.

DETAILED DESCRIPTION OF THE INVENTION

In the following, embodiments of the present disclosure will now be described in detail in conjunction with accompanying drawings.

Figure 1:
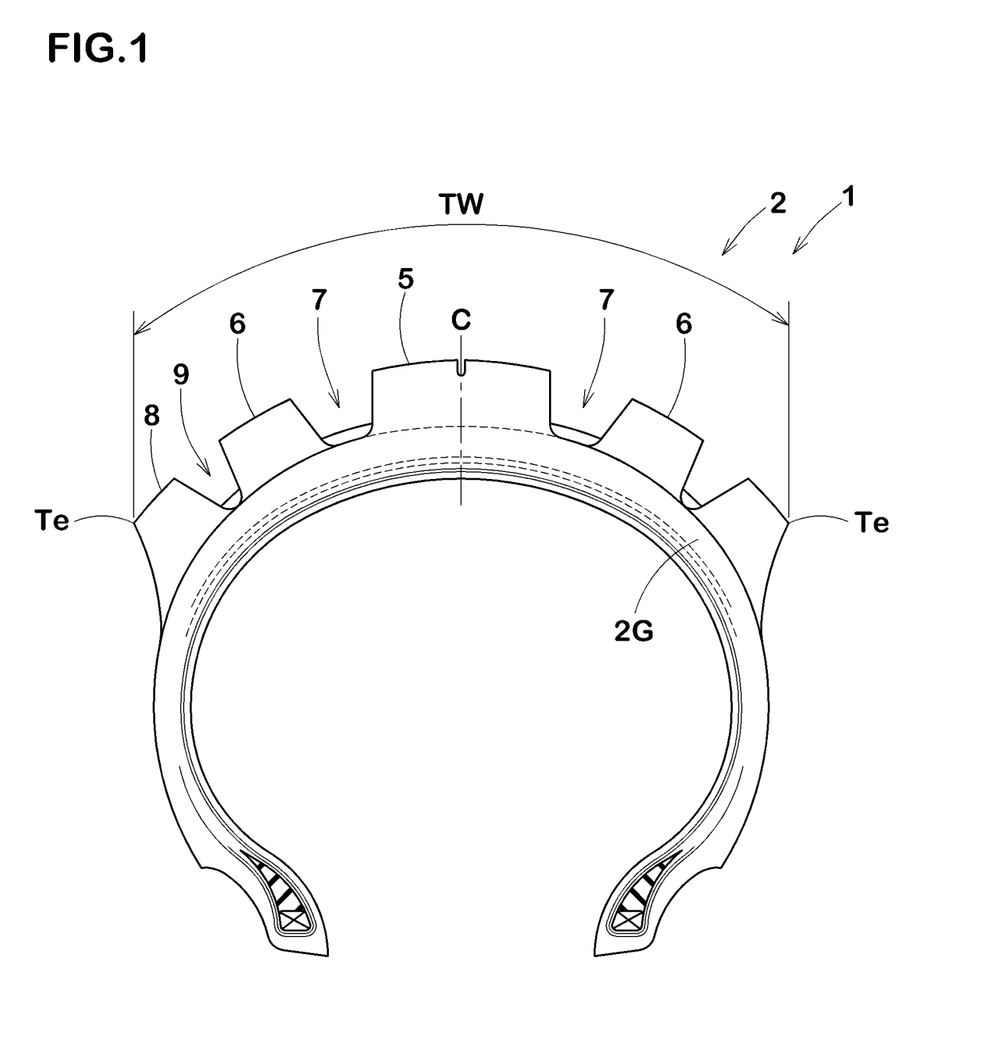
FIG. 1 is a tire meridian section of the tire for running on rough terrain showing an embodiment of the present disclosure.
Figure 2:
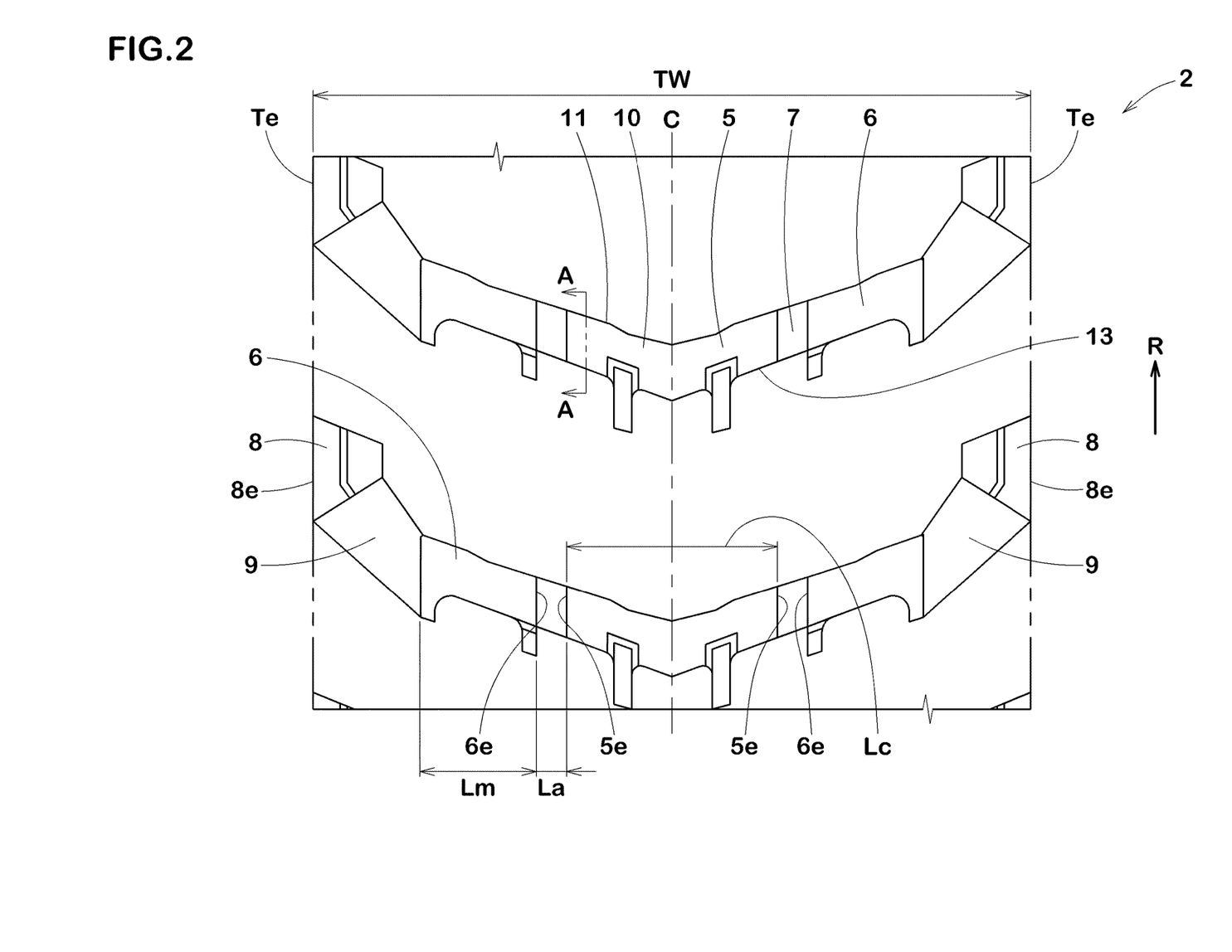
FIG. 2 is a development plan view of the tread portion in FIG. 1.

FIG. 1 is a tire meridian section passing through a tire rotational axis of a tire for running on rough terrain (hereinafter, may be referred to simply as "tire") 1 showing an embodiment of the present disclosure in a standard state. FIG. 2 is a development view of a tread portion 2 of the tire 1. As shown in FIGS. 1 and 2, the tire 1 is a motorcycle tire.

The above-mentioned "standard state" is a state in which the tire 1 is mounted on a standard rim (not shown), inflated to a standard inner pressure, and loaded with no tire load. In the following, unless otherwise noted, the dimensions and the like of various parts of the tire are the values measured in this standard state.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

The tread portion 2 of the tire 1 in the present embodiment has an outer surface curved so as to be convex outward in the tire radial direction. Further, the tread portion 2 of the tire 1 has a directional pattern in which a tire rotational direction (R) is specified.

The tread portion 2 of the present embodiment includes crown blocks 5, middle blocks 6 arranged outside the crown blocks 5 in a tire axial direction, and groove portions (may sometimes be referred to herein as "middle groove portions") 7 arranged between the crown blocks 5 and the middle blocks 6.

Figure 3:
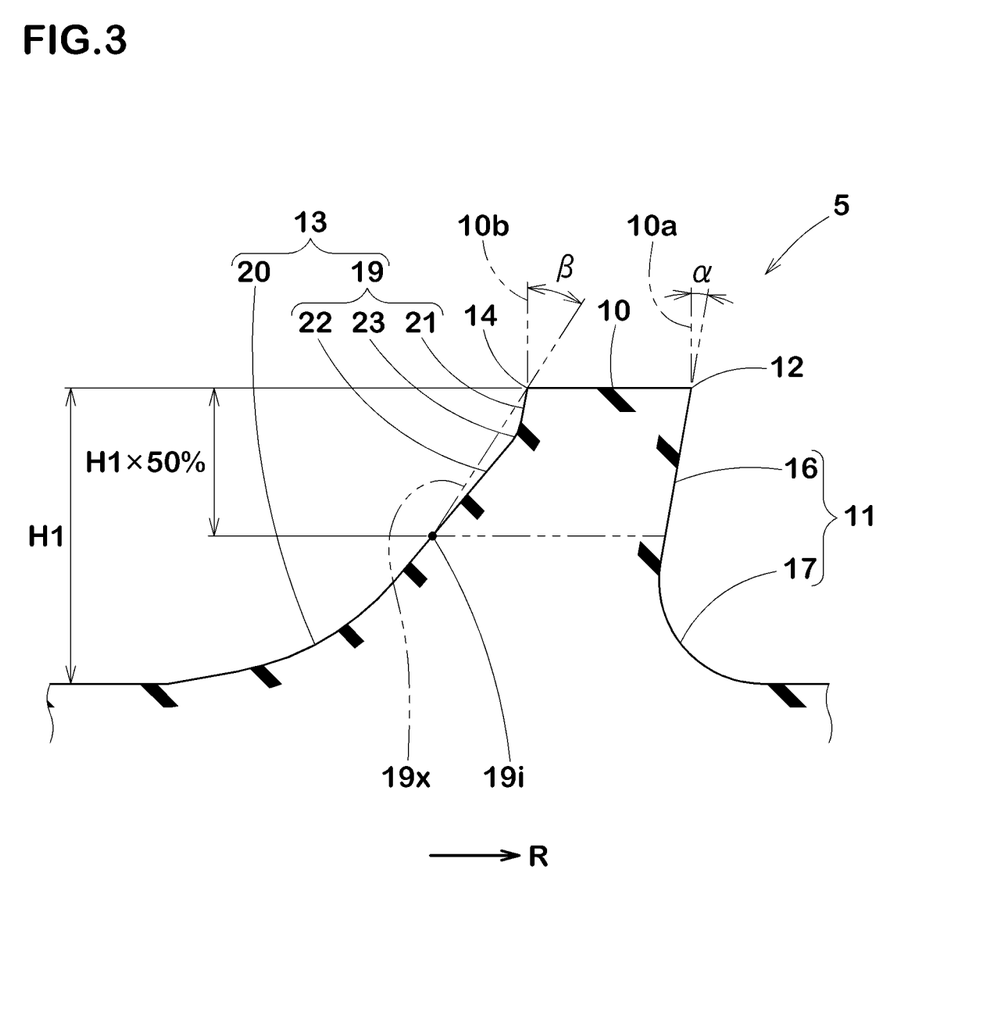
FIG. 3 is an A-A cross-sectional view of FIG. 2.

FIG. 3 is the A-A cross-sectional view of FIG. 2. The A-A line extends along a tire circumferential direction. As shown in FIG. 2 and FIG. 3, each of the crown blocks 5 of the present embodiment includes a ground contacting surface 10, a first wall surface 11 located on the heel side in the tire rotational direction (R), and a first edge 12 located at the intersection of the ground contacting surface 10 and the first wall surface 11. The ground contacting surface 10 is a region that comes into contact with a flat surface when the tire 1 in the standard state is run and loaded with a standard tire load.

The "standard tire load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The first wall surface 11 is inclined to the toe side in the tire rotational direction (R) from the ground contacting surface 10 toward the inside in the tire radial direction. The crown blocks 5 having the first wall surfaces 11 configured as such dig up a rough terrain surface covered with mud and dirt and generate high traction.

Each of the groove portions 7 has a length (La) in the tire axial direction of 5% to 70% of a length (Lm) in the tire axial direction of each of the middle blocks 6. Since the length (La) of each of the groove portions 7 is 70% or less of the length (Lm) of each of the middle blocks 6, the discharge (escape) of the excavated mud from the groove portions 7 is limited to a certain range and it is possible that the excavated mud is compacted and sheared, therefore, greater traction is generated. Since the length (La) of each of the groove portions 7 is 5% or more of the length (Lm) of each of the middle blocks 6, continuous clogging of the groove portions 7 after contacting the ground is prevented. Thereby, it is possible that edges (5e) and (6e) on the groove portions 7 side of the crown blocks 5 and the middle blocks 6 are used effectively during cornering and the like, therefore, excellent steering stability is exerted.

In order to effectively exert the above-described effects, the length (La) of each of the groove portions 7 is preferably 20% or more, more preferably 30% or more, and preferably 60% or less, more preferably 50% or less of the length (Lm) of each of the middle blocks 6.

The tread portion 2 of the present embodiment is provided with shoulder blocks 8 arranged axially outside the middle blocks 6, and groove portions 9 arranged between the shoulder blocks 8 and the middle blocks 6. Each of the shoulder blocks includes an outer edge (8e) located axially outermost thereof, for example. The outer edges (8e) form tread edges (Te) extending in the tire circumferential direction.

The tread portion 2 is formed in a line symmetrical pattern with respect to a tire equator (C) as the center line in the present embodiment. Each of the crown blocks 5 extends across the tire equator (C), for example. The middle blocks 6 and the shoulder blocks 8 are each provided on both sides in the tire axial direction of the crown blocks 5, respectively, for example. The blocks 5, 6, and 8 are each arranged at the same pitch in the tire circumferential direction, in the present embodiment.

As shown in FIG. 3, each of the crown blocks includes a second wall surface 13 located on the toe side in the tire rotational direction (R) and a second edge 14 located at the intersection of the ground contacting surface 10 and the second wall surface 13, for example.

The second wall surface 13 in the present embodiment is inclined to the toe side in the tire rotational direction from the ground contacting surface 10 (R) toward the inside in the tire radial direction. The second wall surfaces 13 configured as such increase the rigidity of the crown blocks and prevents the crown blocks 5 from twisting during running. Therefore, the digging effect of the muddy soil is improved.

The first wall surface 11 and the second wall surface 13 include a first wall surface outer portion 16 and a second wall surface outer portion 19 defined as an area of 50% of a block height H1 of each of the crown blocks 5 from the first edge 12 and the second edge 14, respectively. And an angle $\alpha$ of the first wall surface outer portion 16 with respect to a normal line (10a) of the ground contacting surface 10 passing through the first edge 12 is smaller than an angle $\beta$ of the second wall surface outer portion 19 with respect to a normal line (10b) of the ground contacting surface 10 passing through the second edge 14. Since the angle $\alpha$ is smaller than the angle $\beta$, the twisting of the crown blocks 5 during running is greatly suppressed, therefore, it is possible that the muddy soil is dug up more effectively. If the second wall surface outer portion 19 extends in an arc shape or stepwise, for example, or in other words, if the second wall surface outer portion 19 does not extend linearly, the angle $\beta$ is defined as an angle between the normal line (10b) and a virtual line (19x) passing through the second edge 14 and an inner end (19i) in the tire radial direction of the second wall surface outer portion 19. The angle $\alpha$ is specified in the same way as the angle $\beta$.

In order to effectively exert the above-described effects, it suffices if the angle $\alpha$ is greater than 0 degree, however, the angle $\alpha$ is preferably 5 degrees or more, and more preferably 15 degrees or more. Further, if the angle $\alpha$ is excessively large, the rigidity of the radially inner part of the crown blocks 5 is decreased, therefore, the risk of block chipping and cracking increases. For this reason, the angle $\alpha$ is preferably 45 degrees or less, and more preferably 35 degrees or less.

In order to increase the rigidity of the crown blocks 5, the angle $\beta$ is preferably 5 degrees or more, and more preferably 20 degrees or more. If the angle $\beta$ is excessively large, the distance between the crown blocks 5 lined up in the tire circumferential direction becomes large, and the frequency of digging up the muddy soil becomes small, which may reduce the traction performance. For this reason, the angle $\beta$ is preferably 70 degrees or less, and more preferably 60 degrees or less.

In order to effectively exert the above-mentioned effects, a difference ($\beta-\alpha$) between the angle $\beta$ and the angle $\alpha$ is preferably 5 degrees or more, more preferably 10 degrees or more, and preferably 50 degrees or less, more preferably 40 degrees or less.

The first wall surface outer portion 16 extends linearly from the first edge 12, for example. It should be noted that the first wall surface outer portion 16 is not limited to such a configuration, the first wall surface outer portion 16 may be formed in an arc shape concave toward the toe side in the tire rotational direction (R) from the crown blocks.

The second wall surface outer portion 19 in the present embodiment includes a first portion 21 extending radially inward from the second edge 14 and a second portion 22 located radially inside the first portion 21 and sloping more gently than the first portion 21. The first portion 21 increases the rigidity of the portion on the ground contacting surface 10 side of the crown block 5 that is subjected to particularly large forces, thereby, it is helpful for improving the traction performance. The first portion 21 extends linearly in the present embodiment. The first portion 21 and the second portion 22 are inclined to the toe side in the tire rotational direction (R) as it goes radially inward, for example. The first portion 21 and the second portion 22 in the present embodiment are connected via an arc portion 23 convex toward the heel side in the tire rotational direction (R).

The first wall surface 11 includes a first wall surface inner portion 17 connected directly with the first wall surface outer portion 16 and located radially inside the first wall surface outer portion 16. The second wall surface includes a second wall surface inner portion 20 connected directly with the second wall surface outer portion 19 and located radially inside the second wall surface outer portion 19. The first wall surface inner portion 17 is formed as an arc shape concave toward the toe side in the tire rotational direction (R) of the crown block 5, for example. The second wall surface inner portion 20 is formed as an arc shape convex toward the heel side in the tire rotational direction (R) of the crown block 5, for example. The second wall surface inner portion 20 is formed by an arc having a larger radius of curvature than the first wall surface inner portion 17 in the present embodiment. The first wall surface inner portion 17 and the second wall surface inner portion 20 are not limited to such an embodiment.

Figure 4:
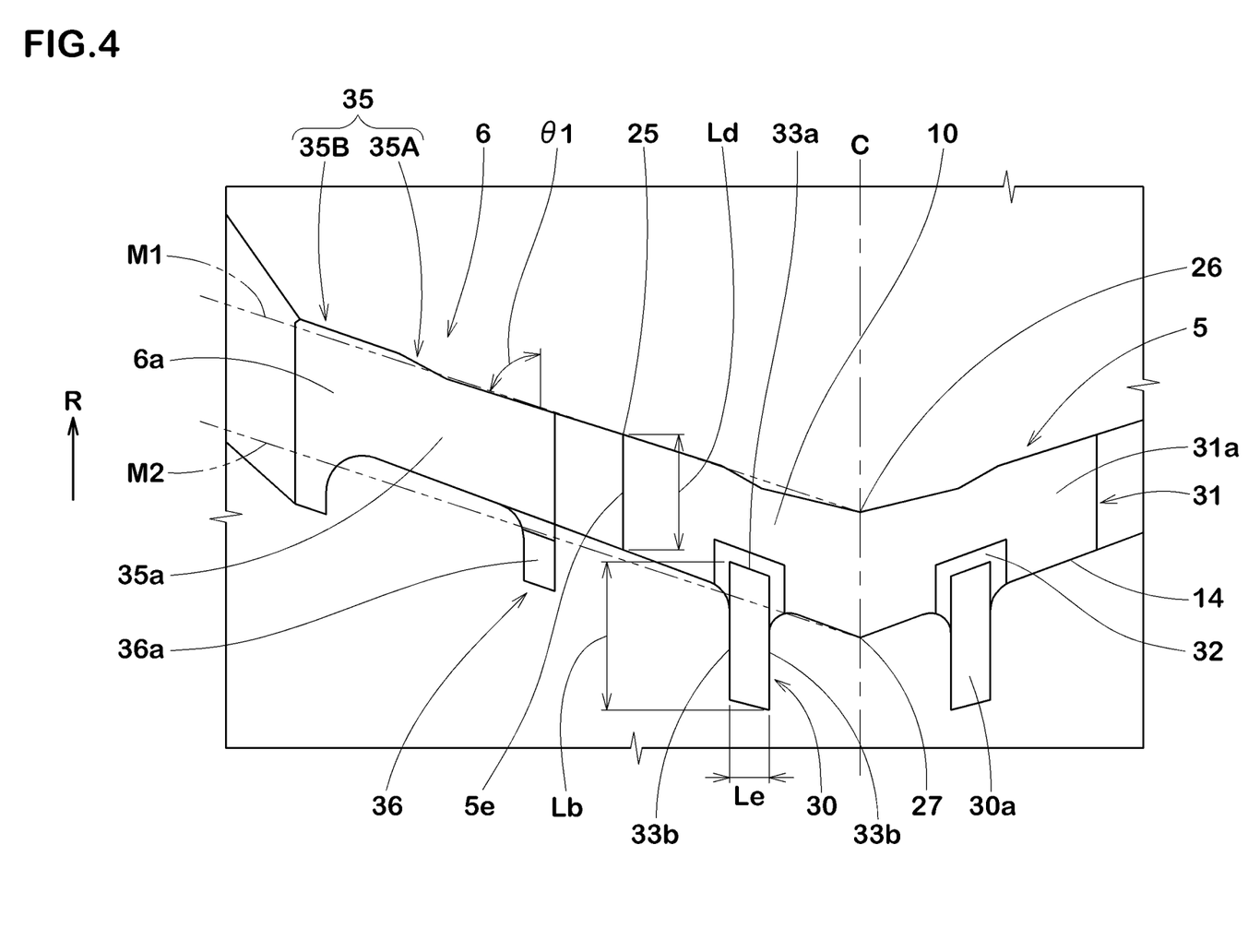
FIG. 4 is an enlarged view of a crown block in FIG. 2.

FIG. 4 is an enlarged view of one of the crown blocks 5 and one of the middle blocks 6. As shown in FIG. 4, each of the crown blocks 5 extends obliquely to the heel side in the tire rotational direction (R) as it goes from the tire equator (C) toward both sides in the tire axial direction in the present embodiment. The crown block 5 configured as such helps to gather the excavated mud to the center side in the tire axial direction of the crown block 5 and to compact it.

The ground contacting surface 10 of each of the crown blocks 5 has first points 25 located on the most heel side in the tire rotational direction (R), a second point 26 located on the most heel side in the tire rotational direction (R) on the tire equator (C), and a third point 27 located on the most toe side in the tire rotational direction (R) on the tire equator (C). And, in the plan view of each axial half of the tread portion 2 with respect to the tire equator (C), in a pair of one of the crown blocks 5 and one of the middle blocks 6 immediately adjacent to each other in the tire axial direction, at least a part of the middle block 6 is located between a first virtual line M1 passing through the first point 25 and the second point 26, and a second virtual line M2 which is a parallel shift of the first virtual line M1 onto the third point 27. Therefore, the middle blocks 6 prevent the mud excavated by the crown blocks 5 from being discharged from the groove portions 7 and the like, thereby, the traction performance is further improved. In order to effectively exert such an effect, it is preferred that 70% or more of an area (Am) of a ground contacting surface (6a) of each of the middle blocks 6 is located between the first virtual line M1 and the second virtual line M2, and it is more preferred that 80% or more of the area (Am) is located between the first virtual line M1 and the second virtual line M2.

It is preferred that an angle θ1 of the first virtual line M1 with respect to the tire circumferential direction is 45 degrees or more and 89 degrees or less. Since the angle θ1 is 45 degrees or more, a large shear force is exerted on the mud. Since the angle θ1 is 89 degrees or less, the mud excavated by the crown block 5 is prevented from escaping toward axially outside the crown block 5. From such a point of view, the angle θ1 is more preferably 60 degrees or more, even more preferably 65 degrees or more, and more preferably 80 degrees or less, and even more preferably 75 degrees or less.

Each of the crown blocks 5 includes crown protruding portions 30 extending in the tire circumferential direction across the second edge 14 in the present embodiment. Each of the crown blocks 5 include the crown protruding portions 30 and a crown main portion 31 formed to cross the tire equator (C), for example. The crown protruding portions 30 is provided on both sides, one on each side, of the tire equator (C). The crown protruding portions 30 configured as such further suppress the crown blocks 5 from bending to the toe side in the tire rotational direction (R) when contacting the ground, for example.

In the tread plane view, each of the crown protruding portions 30 has a rectangular shape in which a length (Lb) in the tire circumferential direction is larger than a length (Le) in the tire axial direction. The crown protruding portions 30 configured as such effectively improve the action described above. Each of the crown protruding portions 30 is formed in a parallelogram shape in the present embodiment. Each of the crown protruding portions 30 may have a rectangular shape, for example. In each of the crown blocks 5, a radially outer surface (30a) of each of the crown protruding portion 30 is located between the tire equator (C) and a respective one of the first points 25 of the crown block 5, for example.

The length (Lb) in the tire circumferential direction of each of the crown protruding portions 30 configured as such is preferably 1.0 times or more, more preferably 1.3 times or more, and preferably 3.0 times or less, more preferably 2.5 times or less a length (Ld) in the tire circumferential direction of the edge (5e) of each of the crown blocks 5. Further, the length (Le) in the tire axial direction of each of the crown protruding portions 30 is preferably 5% or more, more preferably 7% or more, and preferably 13% or less, and more preferably 11% or less, of a length (Lc) (shown in FIG. 2) in the tire axial direction of the crown blocks 5. Furthermore, the length (Lb) in the tire circumferential direction is preferably 2.5 times or more, more preferably 3.0 times or more, and preferably 4.5 times or less, more preferably 4.0 times or less the length (Le) in the tire axial direction of each of the crown protruding portions 30.

The outer surface (30a) in the tire radial direction of each of the crown protruding portions 30 in the present embodiment includes an axial edge (33a) located on the heel side in the tire rotational direction (R) and extending in the tire axial direction and a pair of circumferential edges (33b) extending in the tire circumferential direction on both sides of the axial edge (33a). It is preferred that the outer surface (30a) in the tire radial direction of each of the crown protruding portions 30 is positioned radially outside an outer surface (31a) (same as the ground contacting surface 10) in the tire radial direction of the crown main portion 31 or at the same position in the tire radial direction as the outer surface (31a). Each of the crown protruding portions 30 configured as such exert the effect that the axial edge (33a) and a pair of the circumferential edges (33b) improve the traction performance during straightaway driving and cornering. Each of the crown protruding portions 30 and the crown main portion 31 are separated by a recessed portion 32 recessed radially inward from the outer surface (31a) of the crown main portion 31, for example. The recessed portion 32 in the present embodiment is formed in a substantially U-shape or a C-shape in the tread plane view so as to sandwich a respective one of the crown protruding portions 30.

Each of the crown main portions 31 in the present embodiment is formed in a V-shape extending from the tire equator (C) toward both sides in the tire axial direction obliquely to the heel side in the tire rotational direction (R).

The length (Lc) in the tire axial direction of each of the crown blocks 5 is preferably 20% or more, more preferably 25% or more, and preferably 40% or less, more preferably 35% or less, of a tread development width TW. Further, the length (Ld) in the tire circumferential direction of each of the edges 5e of the crown blocks 5 is preferably 15% or more, more preferably 20% or more, and preferably 35% or less, and more preferably 30% or less, of the length (Lc) in the tire axial direction of each of the crown blocks 5. The tread development width TW is the distance in the tire axial direction between tread edges (Te) when the tread portion 2 is developed on a plane.

Each of the middle blocks 6 includes, for example, a middle main portion 35 inclined to the heel side in the tire rotational direction (R) as it goes outward in the tire axial direction, and a middle protruding portion 36 protruding from the middle main portion 35 to the toe side in the tire rotational direction (R).

The middle main portion 35 is formed in an L-shape including, for example, an equal length portion 35A, which has the same length in the tire circumferential direction, and an increasing length portion 35B, which is directly connected to the equal length portion 35A and has a circumferential length increasing axially outwardly. The above expression of the "same length" means that the difference (S-s) between the maximum value (S) and the minimum value (s) of the length in the tire circumferential direction of the equal length portion 35A is within 10% of the maximum value (S). The equal length portion 35A is located on the heel side in the tire rotational direction (R) of the second virtual line M2 in the present embodiment. The increasing length portion 35B is located on both sides in the tire circumferential direction across the second virtual line M2 in the present embodiment.

The middle protruding portion 36 has an outer surface (36a) in the tire radial direction positioned radially outside an outer surface (35a) (same as the ground contacting surface 10) in the tire radial direction of the middle main portion 35 or at the same position in the tire radial direction as the outer surface (35a). The middle protruding portion 36 configured as such exerts an effect of improving the traction performance during straightaway driving and cornering.

Although not particularly limited, the length (Lm) in the tire axial direction of each of the middle blocks 6 is preferably 5% or more, more preferably 10% or more, and preferably 20% or less, more preferably 15% or less of the tread development width TW.

It is preferred that a tread rubber 2G (shown in FIG. 1), in which the blocks 5, 6, and 8 are formed, has a complex elastic modulus E* of 10 MPa or more and 40 MPa or less. In the present specification, the complex elastic modulus E* is the value measured under the following conditions by using a viscoelasticity spectrometer manufactured by Iwamoto Quartz GlassLab Co., Ltd.
Initial strain: 1%
Amplitude: ±2%
Frequency: 10 Hz
Deformation mode: tensile
Temperature: 30° C.

While detailed description has been made of an especially preferred embodiment of the present disclosure, the present disclosure can be embodied in various forms without being limited to the illustrated embodiment.
All front wheel tires have the same tread pattern.

EXAMPLES

Motorcycle rear wheel tires for running on rough terrain having the basic pattern shown in FIG. 2 were made by way of test according to the specification listed in Table 1. Then, each of the test tires was tested for the traction performance and the steering stability performance. The common specifications and the common test methods for the test tires were as follows.

Test vehicle: Motocross competition vehicle with displacement of 450 cc
Tire size (front wheel, rear wheel): 80/100-21, 120/80-19
Tire rim size (front wheel, rear wheel): 21×1.60, 19×2.15
Tire inner pressure: 80 kPa
The test methods were as follows.

<Traction Performance and Steering Stability Performance>

While a test rider drove the above test vehicle on muddy rough terrain, the traction performance and the steering stability performance were evaluated by the test rider's feeling. Here, the "traction performance" refers to the sensory evaluation by the test rider on the smoothness of running when accelerating during straightaway driving and cornering. The "steering stability performance" refers to the sensory evaluation by the test rider on the running stability including steering operation during straightaway driving and cornering. Each test is presented on a 10-point scale, with 10 being the maximum score.

The test results are shown in Table 1.

TABLE 1

|  | Ref. 1 | Ex. 1 | Ex. 2 | Ex. 3 | Ex. 4 | Ref. 2 | Ref. 3 | Ex. 5 | Ex. 6 |
| --- | --- | --- | --- | --- | --- | --- | --- | --- | --- |
| Angle α of First wall surface outer portion [degree] | 0 | 10 | 10 | 25 | 25 | 10 | 10 | 10 | 10 |
| Angle β of Second wall surface outer portion [degree] | 0 | 30 | 30 | 40 | 30 | 30 | 30 | 30 | 30 |
| Ratio of Length (La) of Groove portion/Length (Lm) of Middle block [%] | 60 | 40 | 40 | 20 | 40 | 3 | 75 | 5 | 70 |
| Presence or Absence of Middle block between Virtual lines M1 and M2 | Presence | Presence | Absence | Presence | Absence | Presence | Presence | Presence | Presence |
| Angle θ1 of First virtual line [degree] | 90 | 75 | 75 | 85 | 85 | 75 | 75 | 75 | 75 |
| Traction performance [10-point scale] | 6 | 9 | 7 | 9 | 7 | 7 | 6 | 8 | 7 |
| Steering stability performance [10-point scale] | 4 | 9 | 9 | 8 | 8 | 6 | 7 | 7 | 8 |
| Total | 10 | 18 | 16 | 17 | 15 | 13 | 13 | 15 | 15 |

From the test results, it is understood that the tires in Examples had improved traction performance and steering stability performance on rough terrain.

[Statement of Disclosure]

The present disclosure includes the following aspects.

[Present Disclosure 1]

A tire for running on rough terrain including a tread portion having a specified tire rotational direction and provided with crown blocks, middle blocks arranged outside the crown blocks in a tire axial direction, and groove portions arranged between the crown blocks and the middle blocks, wherein
   each of the crown blocks includes a ground contacting surface, a first wall surface located on a heel side in the tire rotational direction, and a first edge located at the intersection of the ground contacting surface and the first wall surface,
   the first wall surface is inclined to a toe side in the tire rotational direction as it goes inward in a tire radial direction from the ground contacting surface, and
   each of the groove portions has a length in the tire axial direction of 5% or more and 70% or less of a length in the tire axial direction of each of the middle blocks.

[Present Disclosure 2]

The tire according to present disclosure 1, wherein
   each of the crown blocks has a second wall surface located on the toe side in the tire rotational direction and a second edge located at the intersection of the ground contacting surface and the second wall surface, and the second wall surface is inclined to the toe side in the tire rotational direction as it goes radially inward from the ground contacting surface.

[Present Disclosure 3]

The tire according to present disclosure 2, wherein the first wall surface includes a first wall surface outer portion defined as an area of 50% of a block height of each of the crown block from the first edge, the second wall surface includes a second wall surface outer portion defined as an area of 50% of the block height from the second edge, the first wall surface outer portion has an angle α with respect to a normal line of the ground contacting surface passing through the first edge, the second wall surface outer portion has an angle β with respect to a normal line of the ground contacting surface passing through the second edge, and the angle α is smaller than the angle β.

[Present Disclosure 4]

The tire according to present disclosure 3, wherein the angle α is 45 degrees or less.

[Present Disclosure 5]

The tire according to present disclosure 3 or 4, wherein the angle β is 5 degrees or more and 70 degrees or less.

[Present Disclosure 6]

The tire according to any one of present disclosures 3 to 5, wherein the second wall surface outer portion includes a first portion extending radially inward from the second edge and a second portion located radially inside the first portion and sloping more gently than the first portion.

[Present Disclosure 7]

The tire according to any one of present disclosures 1 to 6, wherein in a plan view of each axial half of the tread portion with respect to a tire equator, the ground contacting surface of each of the crown blocks has a first point located on the most heel side in the tire rotational direction, a second point located on the most heel side in the tire rotational direction on the tire equator, and a third point located on the most toe side in the tire rotational direction on the tire equator, and in a pair of one of the crown blocks and one of the middle blocks immediately adjacent to each other in the tire axial direction, at least a part of the middle block is located between a first virtual line passing through the first point and the second point, and a second virtual line obtained by shifting the first virtual line in parallel onto the third point.

[Present Disclosure 8]

The tire according to present disclosure 7, wherein the first virtual line has an angle of 45 degrees or more and 89 degrees or less with respect to the tire circumferential direction.

[Present Disclosure 9]

The tire according to any one of present disclosures 1 to 8, wherein each of the crown blocks extends across a tire equator.

[Present Disclosure 10]

The tire according to any one of present disclosures 1 to 9, wherein each of the crown blocks extends obliquely to the heel side in the tire rotational direction from the tire equator toward both sides in the tire axial direction.

1 tire for running on rough terrain
2 tread portion
5 crown block
6 middle block
7 groove portion
10 ground contacting surface
11 first wall surface
La length of groove portion
Lm length of middle block

The invention claimed is:

1. A tire for running on rough terrain comprising a tread portion having a specified tire rotational direction and provided with crown blocks, middle blocks arranged outside the crown blocks in a tire axial direction, and groove portions arranged between the crown blocks and the middle blocks, wherein each of the crown blocks includes a ground contacting surface, a first wall surface located on a heel side in the tire rotational direction, and a first edge located at the intersection of the ground contacting surface and the first wall surface, the first wall surface is inclined to a toe side in the tire rotational direction as it goes inward in a tire radial direction from the ground contacting surface, each of the groove portions has a length in the tire axial direction of 5% or more and 70% or less of a length in the tire axial direction of each of the middle blocks, the ground contacting surface of each of the crown blocks extends continuously across a tire equator, each of the crown blocks has a second wall surface located on the toe side in the tire rotational direction and a second edge located at the intersection of the ground contacting surface and the second wall surface, each of the crown blocks includes a crown main portion formed to cross the tire equator and a pair of crown protruding portions each extending in a tire circumferential direction across the second edge so as to protrude from the crown main portion, the ground contacting surface of each of the crown blocks has a first point located on the most heel side in the tire rotational direction, a second point located on the most heel side in the tire rotational direction on the tire equator, and a third point located on the most toe side in the tire rotational direction on the tire equator, in each of the crown blocks, the first edge extends axially outward to both sides from the second point and inclined to the heel side, and the second edge extends axially outward to both sides from the third point and inclined to the heel side, in a pair of one of the crown blocks and one of the middle blocks immediately adjacent to each other in the tire axial direction, at least a part of the middle block is located between a first virtual line passing through the first point and the second point, and a second virtual line obtained by shifting the first virtual line in parallel onto the third point, each of the middle blocks includes a middle main portion inclined to the heel side in the tire rotational direction as it goes outward in the tire axial direction, and a middle protruding portion protruding from an axially inner end of the middle main portion to the toe side in the tire rotational direction and extending in the tire circumferential direction so as to have a circumferential length larger than an axial length, and in each of the middle blocks, 70% or more of a ground contacting surface area is located between the first virtual line and the second virtual line so that the entire area of an outer surface in the tire radial direction of the middle protruding portion is located on the toe side of the second virtual line.

2. The tire according to claim 1, wherein the second wall surface is inclined to the toe side in the tire rotational direction as it goes radially inward from the ground contacting surface.

3. The tire according to claim 2, wherein
the first wall surface includes a first wall surface outer portion defined as an area of 50% of a block height of each of the crown blocks from the first edge,
the second wall surface includes a second wall surface outer portion defined as an area of 50% of the block height from the second edge,
the first wall surface outer portion has an angle α with respect to a normal line of the ground contacting surface passing through the first edge,
the second wall surface outer portion has an angle β with respect to a normal line of the ground contacting surface passing through the second edge, and
the angle α is smaller than the angle β.

4. The tire according to claim 3, wherein the angle α is 45 degrees or less.

5. The tire according to claim 3, wherein the angle β is 5 degrees or more and 70 degrees or less.

6. The tire according to claim 3, wherein the second wall surface outer portion includes a first portion extending radially inward from the second edge and a second portion located radially inside the first portion and sloping more gently than the first portion.

7. The tire according to claim 1, wherein the first virtual line has an angle of 45 degrees or more and 89 degrees or less with respect to the tire circumferential direction.

8. The tire according to claim 1, wherein each of the crown blocks extends obliquely to the heel side in the tire rotational direction from the tire equator toward both sides in the tire axial direction.

9. The tire according to claim 3, wherein a difference (β−α) between the angle β and the angle α is 5 degrees or more and 50 degrees or less.

10. The tire according to claim 3, wherein
the first wall surface includes a first wall surface inner portion connected directly with the first wall surface outer portion and located radially inside the first wall surface outer portion,
the second wall surface includes a second wall surface inner portion connected directly with the second wall surface outer portion and located radially inside the second wall surface outer portion,
the first wall surface inner portion is formed as an arc shape concave toward the toe side in the tire rotational direction,
the second wall surface inner portion is formed as an arc shape concave toward the heel side in the tire rotational direction, and
the second wall surface inner portion has a radius of curvature larger than a radius of curvature of the first wall surface inner portion.

11. The tire according to claim 1, wherein
each of the crown protruding portions has a parallelogram shape in which a length in the tire circumferential direction is larger than a length in the tire axial direction in the tread plane view,
in each of the crown blocks, the crown protruding portions are arranged on both sides, one on each side, of the tire equator,
each of the crown protruding portions has axial edges on both circumferential ends thereof, and
each of the axial edges are inclined to the heel side as it goes axially outward.

12. The tire according to claim 1, wherein each of the crown protruding portions has an outer surface in the tire radial direction positioned radially outside an outer surface in the tire radial direction of the crown main portion.

13. The tire according to claim 12, wherein each of the crown protruding portions is separated from the crown main portion by a recessed portion recessed radially inward from the outer surface of the crown main portion.

14. The tire according to claim 13, wherein the recessed portion is formed in a U-shape or a C-shape in the tread plane view so as to envelope a respective one of the crown protruding portions on the side where the crown protruding portion is closest to the crown main portion.

15. The tire according to claim 1, wherein the middle main portion is formed in an L-shape including an equal length portion having a constant circumferential length, and an increasing length portion directly connected to the equal length portion on an axially outer side thereof and having a circumferential length increasing axially outwardly.

16. The tire according to claim 1, wherein the middle protruding portion has an outer surface in the tire radial direction positioned radially outside an outer surface in the tire radial direction of the middle main portion.

17. The tire according to claim 1, wherein each of the crown blocks has circumferential edges extending in the tire circumferential direction on both axial ends thereof, and
wherein, in each of the crown blocks, a length in the tire circumferential direction of each of the crown protruding portions is 1.0 times or more and 3.0 times or less a length in the tire circumferential direction of each of the circumferential edges.

18. A tire for running on rough terrain comprising a tread portion having a specified tire rotational direction and provided with crown blocks, middle blocks arranged outside the crown blocks in a tire axial direction, and groove portions arranged between the crown blocks and the middle blocks,
wherein each of the crown blocks includes a ground contacting surface, a first wall surface located on a heel side in the tire rotational direction, and a first edge located at the intersection of the ground contacting surface and the first wall surface,
wherein the first wall surface is inclined to a toe side in the tire rotational direction as it goes inward in a tire radial direction from the ground contacting surface,
wherein each of the groove portions has a length in the tire axial direction of 5% or more and 70% or less of a length in the tire axial direction of each of the middle blocks,
wherein the ground contacting surface of each of the crown blocks extends continuously across a tire equator,
wherein each of the crown blocks has a second wall surface located on the toe side in the tire rotational direction and a second edge located at the intersection of the ground contacting surface and the second wall surface,
wherein each of the crown blocks includes a crown main portion formed to cross the tire equator and a pair of crown protruding portions each extending in a tire circumferential direction across the second edge so as to protrude from the crown main portion,
wherein the ground contacting surface of each of the crown blocks has a first point located on the most heel side in the tire rotational direction, a second point located on the most heel side in the tire rotational direction on the tire equator, and a third point located on the most toe side in the tire rotational direction on the tire equator, wherein, in each of the crown blocks, the first edge extends axially outward to both sides from the first second point and inclined to the heel side, and the second edge extends axially outward to both sides from the third point and inclined to the heel side, wherein, in a pair of one of the crown blocks and one of the middle blocks immediately adjacent to each other in the tire axial direction, at least a part of the middle block is located between a first virtual line passing through the first point and the second point, and a second virtual line obtained by shifting the first virtual line in parallel onto the third point, wherein each of the middle blocks includes a middle main portion inclined to the heel side in the tire rotational direction as it goes outward in the tire axial direction, and a middle protruding portion protruding from an axially inner end of the middle main portion to the toe side in the tire rotational direction, wherein, in each of the middle blocks, 70% or more of a ground contacting surface area is located between the first virtual line and the second virtual line and the middle protruding portion is located on the toe side of the second virtual line, and wherein the middle main portion is formed in an L-shape including an equal length portion having a constant circumferential length, and an increasing length portion directly connected to the equal length portion on an axially outer side thereof and having a circumferential length increasing axially outwardly so that each of the middle blocks has a U-shape or a C-shape in a tread plane view.

* * * * *